(12) United States Patent
Frankel et al.

(10) Patent No.: US 9,033,361 B2
(45) Date of Patent: May 19, 2015

(54) FOLDABLE TROLLEY

(71) Applicant: Zenithen USA, LLC, Diamond Bar, CA (US)

(72) Inventors: Andrew David Frankel, Yorba Linda, CA (US); Shi-Ping Zheng, Fuzhou (CN)

(73) Assignee: Zenithen USA, LLC, Diamond Bar, CA (US)

( * ) Notice: Subject to any disclaimer, the term of this patent is extended or adjusted under 35 U.S.C. 154(b) by 0 days.

(21) Appl. No.: 13/908,726

(22) Filed: Jun. 3, 2013

(65) Prior Publication Data

US 2014/0353947 A1 Dec. 4, 2014

(51) Int. Cl.
  *B62B 3/02* (2006.01)
(52) U.S. Cl.
  CPC ..................................... *B62B 3/027* (2013.01)
(58) Field of Classification Search
  USPC .............. 280/639, 38, 651, 659, 47.34, 47.35
  See application file for complete search history.

(56) References Cited

U.S. PATENT DOCUMENTS

| | | | | |
|---|---|---|---|---|
| 5,265,892 A | * | 11/1993 | Said | 280/30 |
| 6,003,894 A | * | 12/1999 | Maher | 280/639 |
| 6,598,898 B2 | * | 7/2003 | Chu | 280/652 |
| 7,547,037 B2 | * | 6/2009 | Poppinga et al. | 280/651 |
| 8,011,686 B2 | * | 9/2011 | Chen et al. | 280/651 |
| 2005/0275195 A1 | * | 12/2005 | Matula et al. | 280/651 |
| 2008/0061524 A1 | * | 3/2008 | Goldszer | 280/47.34 |
| 2011/0204598 A1 | * | 8/2011 | Stevenson | 280/639 |

* cited by examiner

*Primary Examiner* — John Walters
(74) *Attorney, Agent, or Firm* — Merek, Blackmon & Voorhees, LLC

(57) ABSTRACT

The present invention relates to a foldable trolley having a trolley frame and a flexible fabric bag or the like. The invention is characterized by its unique design that includes a light weight structure, a large supported space and can be conveniently folded and unfolded. The trolley can alternatively be folded into a flat structure to save storage space or put into a car trunk for shopping or for the temporary transporting of goods. In this structure, both sides of the handhold U frame are directly hinged to the lower frame. The motive force can be directly transmitted to the lower frame. The overall shape appeals to the public aesthetic sense; and moreover, the hinge point between the handhold U frame and lower frame is the center for unfolding and folding, and thus has a smoother operation.

8 Claims, 6 Drawing Sheets

FOLDABLE TROLLEY

TECHNICAL FIELD

This invention relates to a foldable trolley that can be folded into a small, flat structure suitable for storage in a car trunk or for household storage, and which can be used for shopping as well as the temporary transportation of goods.

BACKGROUND

Trolleys in the market place are most commonly fixed, rigid structures such as supermarket carts ("trolleys"), which are large and not suitable for convenient storage or for placing into a car trunk. Other types of foldable shopping trolleys such as that shown in Chinese patent CN99229075.9 introduce a foldable trolley made up of two lower cross frames with rollers and an associated upper and lower carrying frame. The associated carrying frame is made up of two U frames hinged at both ends, and a rigid storing basket is set on the carrying frame. The main body of this trolley can be foldable, but the storing basket cannot, and the separated structure is therefore not convenient for storage. Additionally the space for goods is particularly small.

Chinese Patent CN201685842U introduces another foldable trolley with a large goods-storage space. The trolley is made up of a foldable trolley frame and flexible fabric. The foldable trolley frame consists of a lower frame, a handhold U frame, a connecting bar, front rollers and back rollers. The front part of the handhold U frame at both sides of the foldable trolley is fixed with a connecting piece. The connecting piece is connected to the lower frame back part via a connecting bar, and the back rollers are fixed to the lower frame back side. The upper parts of the support U bar are respectively hinged to both middle parts of the handhold U frame. Each of the middle parts is hinged with a sleeve corresponding to the connecting bar at the same side. The lower frame front part is supported by the transverse bar at the support U bar with the front rollers. The lower frame back part is installed with back rollers. The flexible fabric is preferably in the form of a bag. The upper and lower edges are fixed to the handhold U frame and to the lower frame. In this structure, the support U bar can be folded back around the hinged point with the handhold U frame, and thus the handhold U frame, connecting bar and lower frame can be folded together into a flat structure, stored in the car trunk, or used for goods transportation. However, because the handhold frame is at the front of this structure, the bag is suspended on the frame, and the shape is not ascetically attractive.

SUMMARY OF THE INVENTION

The present invention provides a foldable trolley with the handhold U frame at the back and with the bag upper edges supported by the upper U frame and the front U frame. The handhold U frame and lower frame can be folded into a flat structure.

The technical solution of this invention is realized by a foldable trolley having a trolley frame and flexible fabric. The trolley frame consists of a lower frame, upper U frame, front U frame, handhold U frame, support U frame, front rollers and back rollers. The back rollers are installed at the back of the lower frame, the front rollers are installed at the transversal ("transverse" or "cross") bar supporting the U frame. The transversal bar supporting the U frame can support the front part of the lower frame. The flexible fabric is a bag structure. The lower edges of the bag are fixed to the lower frame. Both sides of the handhold U frame are respectively hinged to both sides of lower frame back part. The middle part is hinged to both sides of the upper U frame back part. The front U frame and support U frame are hinged to each other at the middle part. Both sides of the front U frame are respectively hinged to both sides of the lower frame middle part, and both sides of the support U frame are respectively hinged to both sides of the upper U frame front part. The hinging mode is a movable hinge, and the foldable trolley frame can be unfolded and folded by each movable hinge. The upper edges of the bag are fixed to the upper U frame and transversal bar of the front U frame. In the trolley frame, the hinge point of the handhold U frame and lower frame back part is the center point for unfolding and folding. The upper U frame, support U frame and front U frame can rotate around the corresponding hinge point until they are fully unfolded or folded.

Both sides of the upper U frame middle part are respectively hinged to both sides of the lower frame middle part by a connecting bar. This connecting bar forms a 4-bar connecting mechanism with parts of lower frame, upper U frame and handhold U frame. Therefore the unfolding and folding process is smoother, and the rigidity of the trolley frame can be reinforced.

The front U frame and the support U frame have a pair of connecting piece at the top of middle cross hinges. This pair of connecting piece is hinged together at one end by two connecting pieces, and the other end is hinged to the front U frame and support U frame. There is also a handle at the top of one connecting piece. This handle can be positioned at the top of the other connecting piece after the two connecting pieces are unfolded to form a wide-opened structure. Because of this pair of connecting pieces when the trolley frame is fully unfolded, the angle between the front U frame and support U frame can be fixed, and the support U frame can be prevented from being knocked back by any barrier during high speed forward motion.

One end of the support U frame may be fixed with a buckle by which the handhold U frame can be buckled to lock the folded trolley frames when the trolley is folded.

The lower frame may be a closed rectangular frame consisting of a U frame and a short bar, both sides of the U frame are respectively fixed to both ends of the short bar with plastic pieces, and a grid layer is set in the lower frame for carrying goods.

Back rollers may be installed to the plastic pieces around which the rollers can rotate in 360° of freedom. The rollers facilitate trolley turning and support the folded trolley standing on the ground stably.

This invention is characterized in a reasonable design, light structure, convenient operation for folding and unfolding, and large space supported. It can be folded into a flat structure to save storage space, and/or be put into the car trunk for shopping or temporary goods transporting. By this structure, both sides of the handhold U frame are directly hinged to the lower frame. The motive force can be directly transmitted to the lower frame. Additionally, the overall shape favorably caters to the public aesthetic sense. Moreover, the hinge point between the handhold U frame and lower frame is the center for unfolding and folding, and thus it is smoother for operating.

BRIEF DESCRIPTION OF THE DRAWINGS

This utility model is further explained by the followings with attached drawings.

EXPLANATION OF REFERENCE NUMERALS

A. 1—Lower frame
B. 2—Upper U frame
C. 3—Front U frame
D. 4—Handhold U frame
E. 5—Support U frame
F. 6—Front rollers
G. 7—Back rollers
H. 8—Connecting bar
I. 9—Connecting pair
J. 11—U frame
K. 12—Short bar
L. 13—Plastic piece
M. 14—Grid layer
N. 15—Hinge base
O. 31—Transversal bar
P. 52—Buckle
Q. 91—Connecting pieces
R. 92—Handle
S. 100—Bag

DETAILED DESCRIPTION OF THE INVENTION

Figure 1:
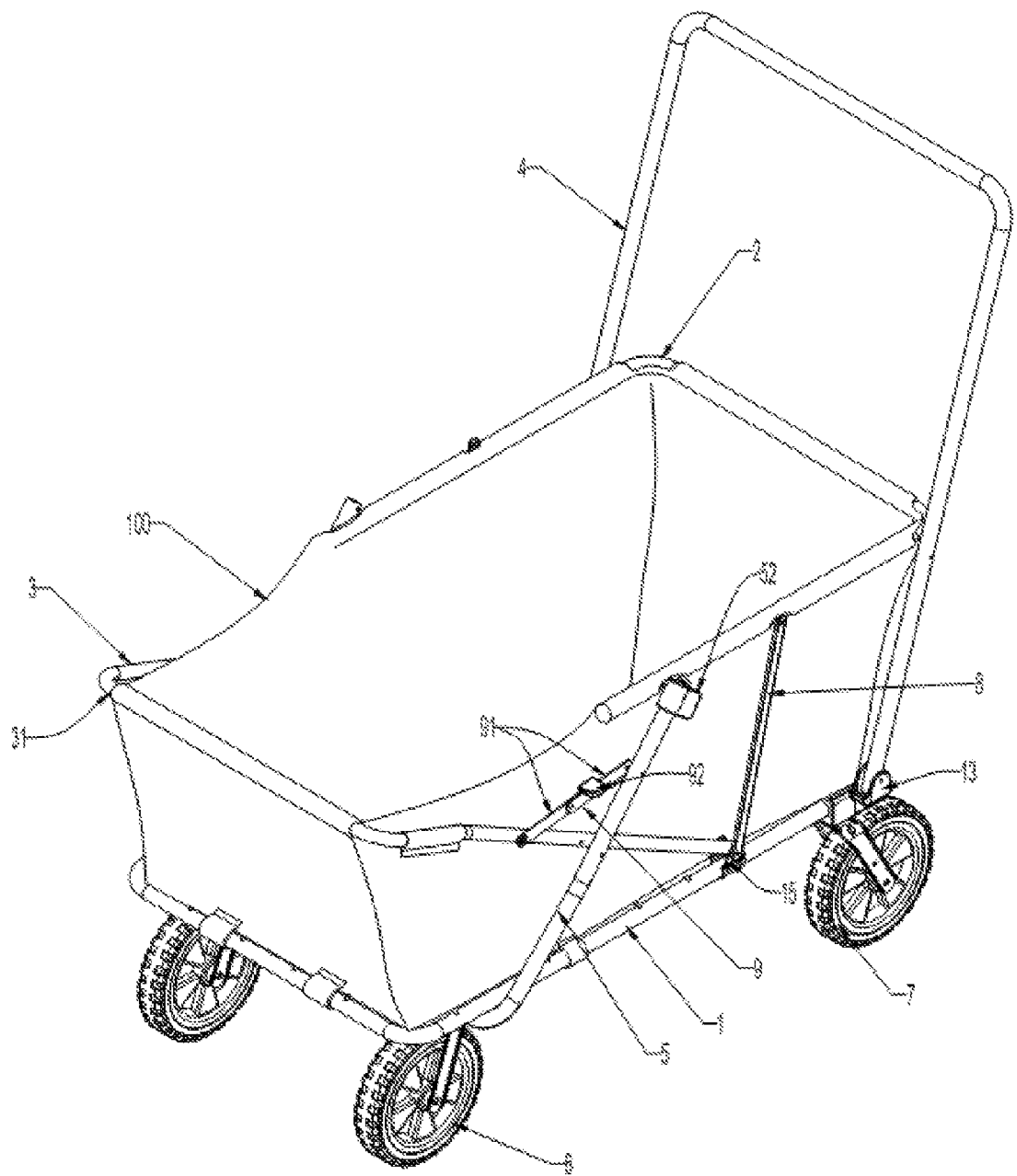
FIG. 1: Schematic view for the foldable trolley.
Figure 2:
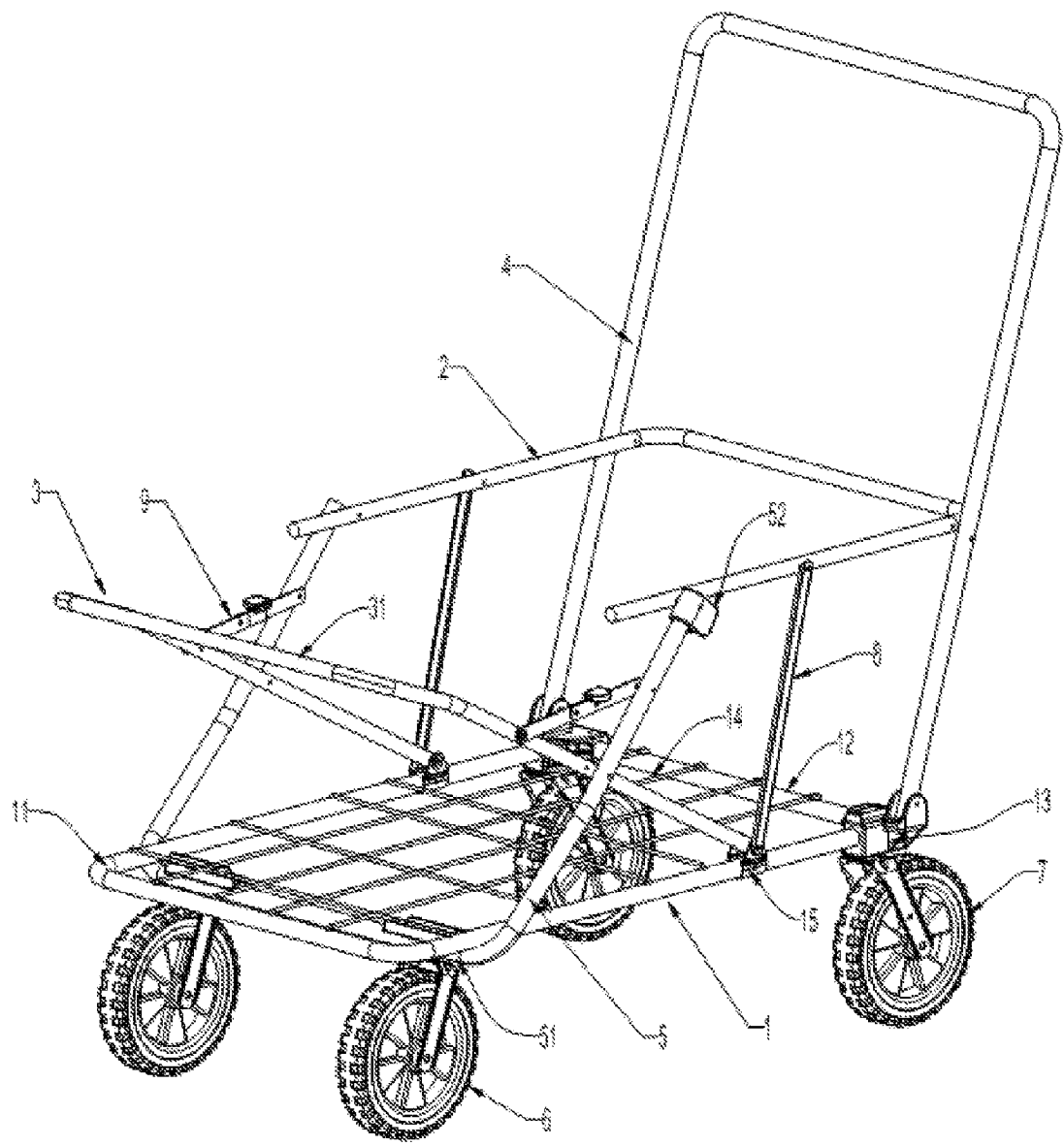
FIG. 2: Schematic drawing for the foldable trolley frame.

Referring to FIG. 1, the foldable trolley is made up of a foldable trolley frame, and the flexible fabric is a bag 100 structure. The upper and lower edges of the bag 100 are respectively fixed to the foldable trolley frame. When the foldable frame is folded, the flexible fabric of bag 100 will be folded together without influencing or interfering with the operation of unfolding or folding.

Figure 4:
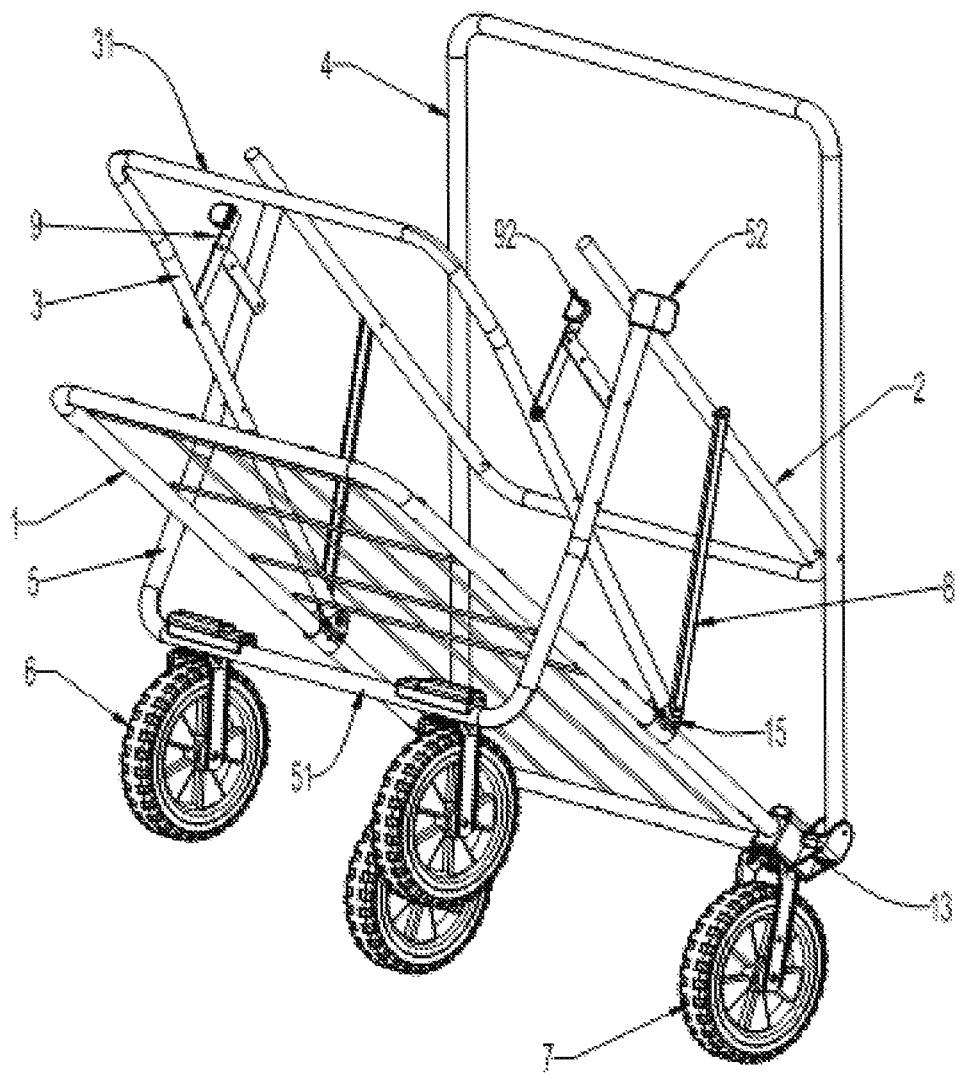
FIG. 4: Schematic drawing for the foldable trolley frame folding process.
Figure 5:
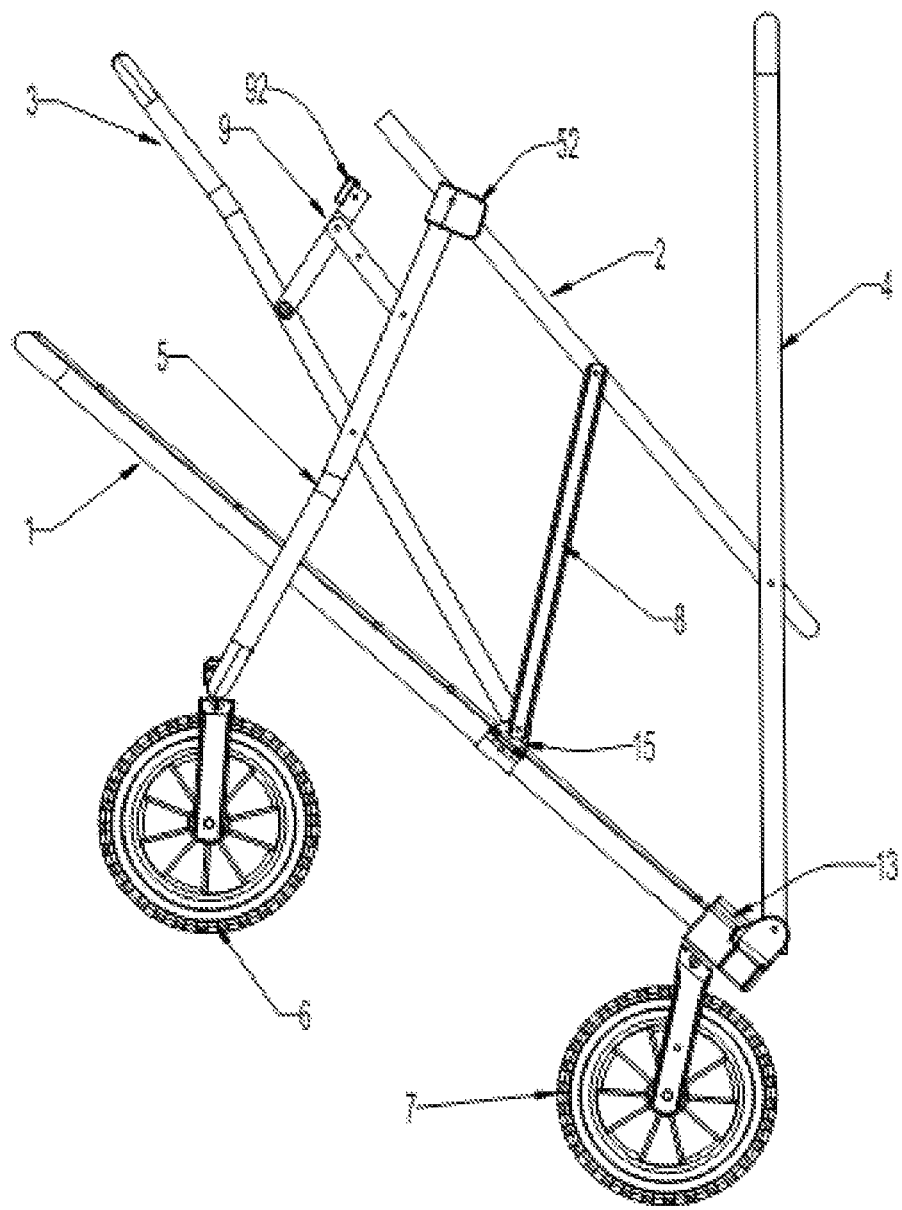
FIG. 5: Side view of the foldable trolley frame folding process.
Figure 6:
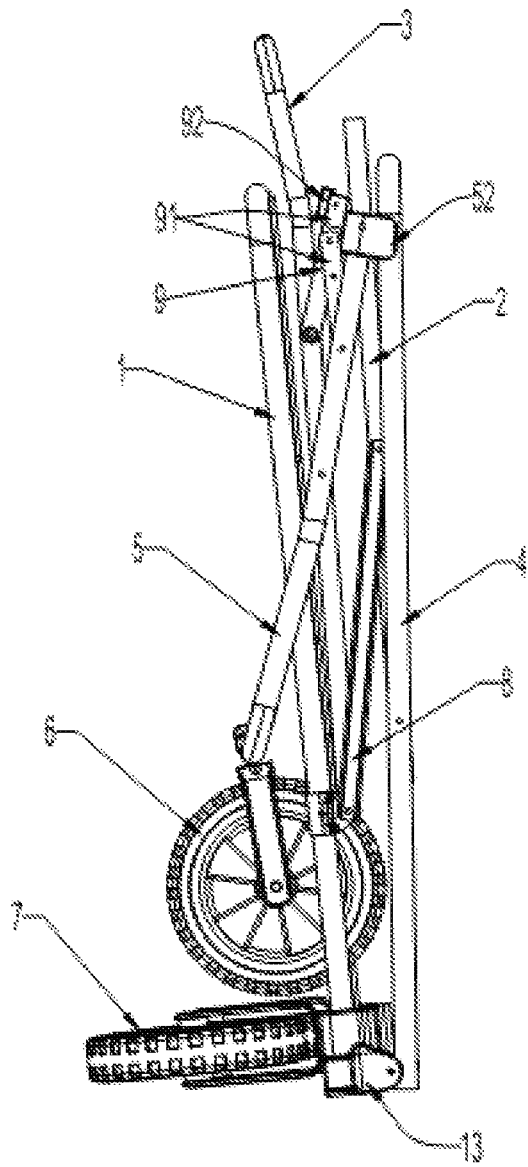
FIG. 6: Side view of the folded state of foldable trolley frame.

Referring to FIGS. 2-6, the foldable trolley frame consists of a lower frame 1, upper U frame 2, front U frame 3, handhold U frame 4, support U frame 5, front rollers 6 and back rollers 7. The lower frame 1 is a closed rectangular frame consisting of U frame 11 and short bar 12. Both ends of the U frame are respectively fixed to the short bar 12 via the plastic piece 13. A grid layer 14 is set in the lower frame 1. The grid layer 14 can support the bottom of bag 100 for carrying goods. The back rollers 7 are installed at the back of the lower frame 1. In particular, the back rollers 7 are installed to the plastic piece 13, and the back roller 7 can rotate around the plastic 13 in 360°, and thus the trolley can turn flexibly and rotate within 90° in the folded state to support the standing foldable trolley, as shown in FIG. 6.

Both sides of the handhold U frame 4 are respectively hinged to both sides of lower frame 1 back part. The middle part is hinged to both sides of the upper U frame 2 back part. The front U frame 3 and support U frame 5 are hinged to each other at the middle part. Both sides of the front U frame 3 are respectively hinged to both sides of the lower frame 1 middle part, and both sides of the support U frame 5 are respectively hinged to both sides of the upper U frame 2 front part. The transversal beam 51 supporting the U frame 5 can support the front part of lower frame 1 and the whole lower frame 1. The front rollers 6 installed to the transversal beam 51 supporting the U frame 5 support the lower frame 1 with the back rollers 7. All of above hinges are movable hinges, and the foldable trolley frame can be unfolded and folded by each movable hinge. Referring to FIG. 1, the upper edges of the bag 100 are fixed to the upper U frame 2 and transversal bar 31 of the front U frame 3. The lower edges of bag 100 are fixed to the lower frame 1. In particular, the lower edges are fixed or fitted to the U frame 11 and to short bar 12 of the lower frame 1 via lace ("strap") fastening or sleeves. The upper edges of bag 100 are fitted to the upper U frame 2 and transversal bar 31 of the front U frame. By this front-back two-section support, a favorable rigid structure is provided to the upper edges of bag 100 by the front and back support from U frame 5 and handhold frame 4, so that the bag 100 is tensioned, and the load can be also carried by the upper U frame 2.

To make the folding and unfolding process smoother, both middle parts of the upper U frame 2 and lower frame 1 are hinged to a connecting bar 8. This connecting bar 8 forms a four-bar connecting mechanism with the lower frame 1, upper U frame 2 and handhold U frame 4. When operating, the four-bar connecting mechanism will be the driving center by which each part can freely rotate around each hinge point for folding and unfolding.

Figure 3:
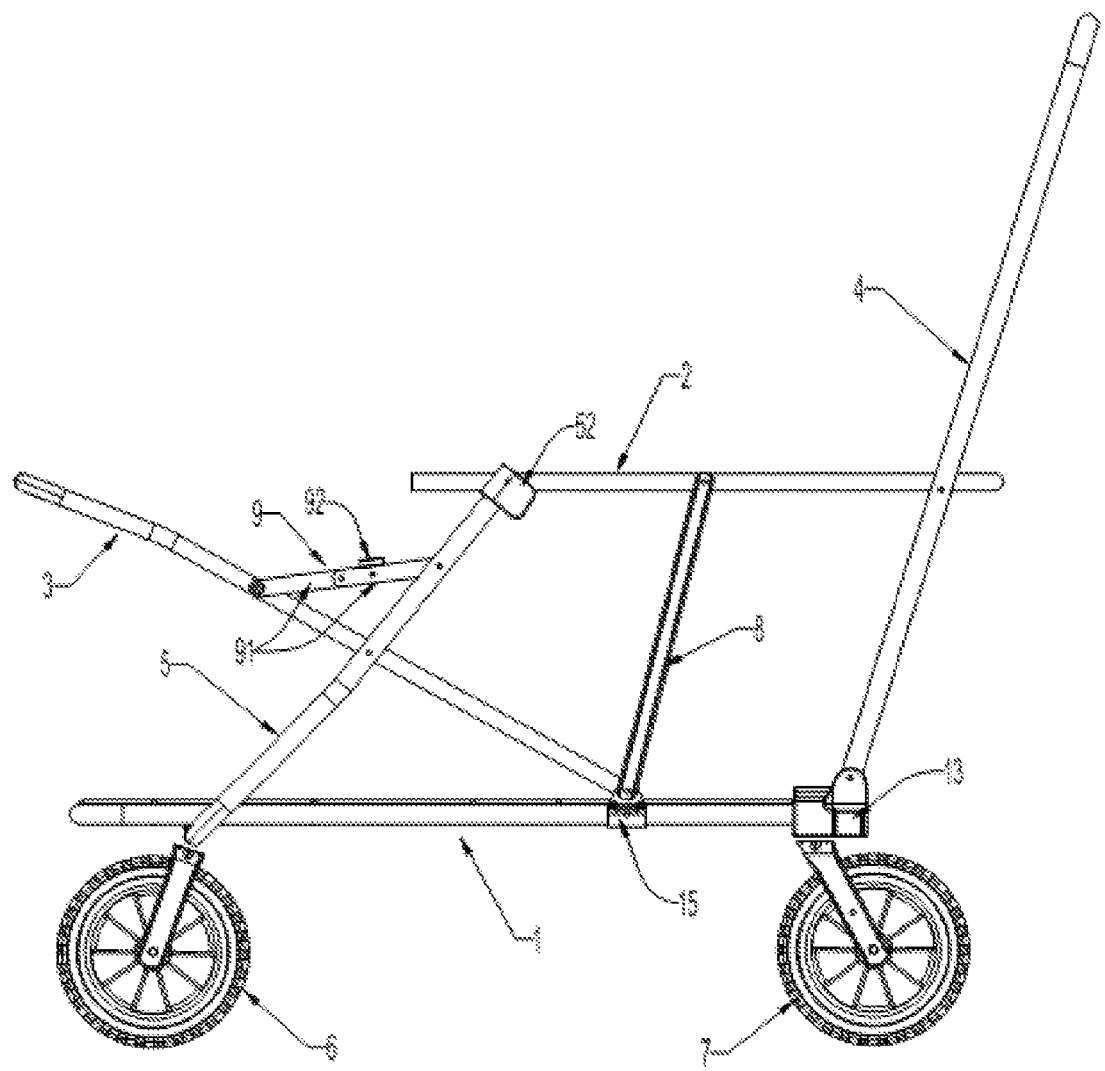
FIG. 3: Side view of the foldable trolley frame.

Referring to FIGS. 3-5, the front U frame 3 and the support U frame 5 have a pair of connecting pieces 9 at the top of middle cross hinges. This pair 9 of connecting piece is hinged together at one end by two connecting pieces, and the other end is hinged to the front U frame 3 and support U frame 5. There is a handle 92 at the top of one connecting piece 91. This handle 92 can be positioned at the top of the other connecting piece 91 after the two connecting pieces 91 are unfolded to form a wide-opened structure. Referring now to FIG. 3, when the trolley frame is fully unfolded the angle between the front U frame 3 and support U frame 5 can be fixed because of this pair of connecting pieces 9. The support U frame 5 can be prevented from being knocked back by any barrier to the high speed rolling front rollers 6. The rigid front U frame 3 is further reinforced, and load can be also carried by the transversal bar 31 of the front U frame 3. The trolley frame can be folded only by pulling up the handle 92 at both sides via the folding process shown in FIG. 4 and FIG. 5 till it is folded into the state shown in FIG. 6.

For positioning or locking the folded state, a buckle 52 is attached to one end of support U frame 5, this buckle 52 will be buckled to the handhold frame 4 when the trolley frame is fully folded, and thus the foldable trolley frame is folded into a locked structure.

The above example is the optimal solution of this utility model, in which, both ends of the handhold U frame 4 are respectively hinged to the plastic piece 13 of the lower frame 1, the connecting bar 8 and the front U frame 3 are hinged to the same middle point at both sides, and it will be easier for assembling if the connecting bar 8 and both ends of the front U frame 3 are hinged to the hinged base 15 at the middle of the lower frame 1. Therefore in any other design, the hinge point at the handhold U frame 4, lower frame 1 and upper U frame 2 can be moved forward with the hinge points at both ends of the connecting bar 8. In this way, the upper end of connecting bar 8 is hinged to the same hinge point for support U frame 5 and upper U frame 2, but such simplification is still envisioned by this invention.

We claim:
1. A foldable trolley comprising:
A trolley frame and flexible fabric: wherein the trolley frame comprises a lower frame, an upper U frame, a front U frame, a handhold U frame, a support U frame, front rollers and back rollers;
the back rollers are installed at a back section of the lower frame, the front rollers are installed at a front section of the support U frame, the flexible fabric is a bag structure having upper edges and lower edges and an open end for receiving and holding material in said bag structure, the lower edges of the bag structure are connected to the lower frame;

said handhold U frame having a middle portion and two side portions;

said lower frame having a front section, a back section, and two side portions, said back section having a middle portion located between the two side portions;

said upper U frame having a back portion and side portions;

said front U frame having a pair of arms on either side of a transversal bar;

said support U frame having a pair of arms;

wherein both side portions of the handhold U frame are respectively hinged to both side portions of the lower frame back section, the middle portion of the handhold U frame is hinged to both side portions of the upper frame back portion;

each of the front U frame pair of arms respectively hingedly connected to a respective one of said pair of arms of said support U frame, each of said pair of arm of the front U frame are respectively hinged to a one of said side portions of the lower frame in a central part of said lower frame, and each of said pair of arms of the support U frame are hinged to a respective one of side portions at a front part of the upper U frame; and wherein the foldable trolley can be unfolded and folded about each hinge; and the upper edges of the bag structure are fixed to the upper U frame and to the transversal bar of the the front U frame.

2. The foldable trolley of claim 1, futher characterized in that each side portion of the upper U frame side portions is respectively hinged to one of the side portions of said two side portions of the lower frame at a middle part of the lower frame by a connecting bar, wherein said connecting bar forms a 4-bar connecting mechanism with parts of said lower frame, said upper U frame and said handhold U frame.

3. The foldable trolley of claim 1, wherein the front U frame and the support U frame are connected by a pair of connecting pieces,
    each of the said pair of connecting pieces including two hinged connecting pieces and a handle at a top of one connecting piece.

4. The foldable trolley mentioned in claim 3 wherein one end of the support U frame includes a buckle by which the handhold U frame can be buckled to the trolley frame when the trolley frame is in a folded configuration.

5. The foldable trolley mentioned in claim 1, wherein one end of the support U frame includes a buckle by which the handhold U frame can be buckled to the trolley frame when the trolley frame is in a folded configuration.

6. The foldable trolley mentioned in claim 5, wherein the back rollers are attached to a pair of plastic pieces, the plastic pieces being affixed to the back section of the lower frame, and wherein the back rollers can rotate around said plastic pieces 360°.

7. The foldable trolley mentioned in claim 1, wherein the lower frame is a closed rectangular frame and a grid layer is attached to the lower frame.

8. The foldable trolley mentioned in claim 1, wherein the back rollers are attached to a pair of plastic pieces, the plastic pieces being affixed to the back section of the lower frame, and wherein the back rollers can rotate 360° around said plastic pieces.

* * * * *